Apr. 10, 1923.

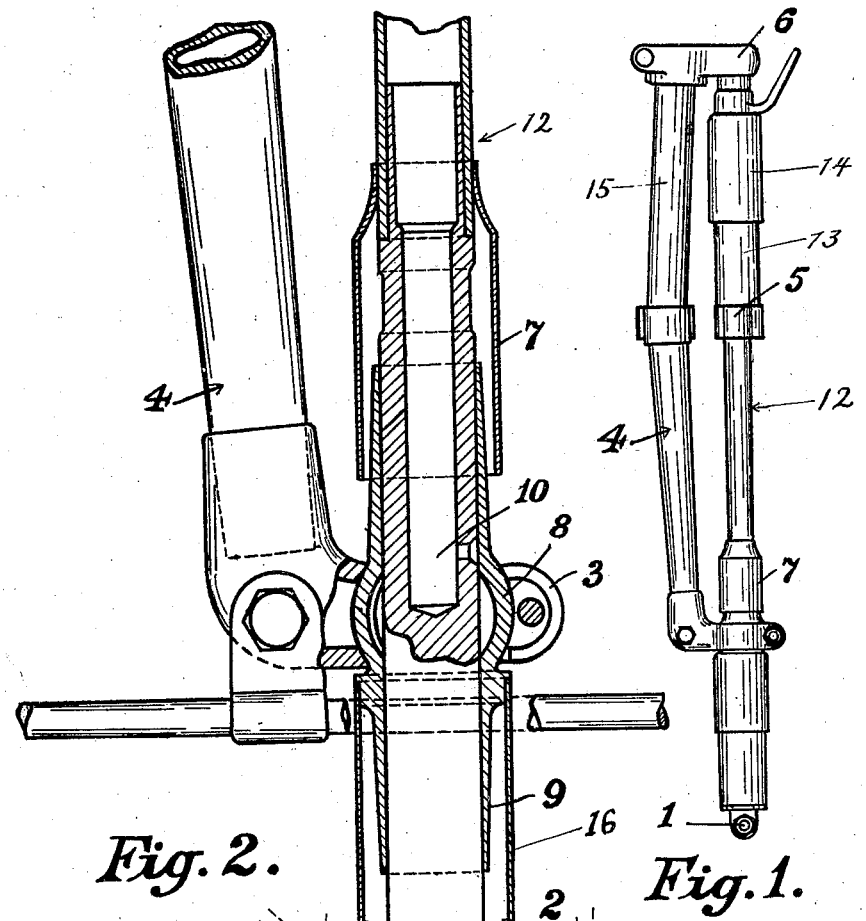

H. O. WOOD

WHEEL FORK 1,451,521

Filed Apr. 7, 1920    2 sheets-sheet 2

Inventor.
Herbert O. Wood
By Sturtevant & Mason
Attorneys.

Patented Apr. 10, 1923.

1,451,521

UNITED STATES PATENT OFFICE.

HERBERT OLIVER WOOD, OF SALTAIRE, ENGLAND.

WHEEL FORK.

Application filed April 7, 1920. Serial No. 371,869.

*To all whom it may concern:*

Be it known that I, HERBERT OLIVER WOOD, subject of the King of Great Britain, residing at Saltaire, in the county of York and Kingdom of England, have invented certain new and useful Improvements in Wheel Forks, of which the following is a specification.

The present invention relates to improvements in forks for motor cycles and the like vehicles.

Motor cycles are frequently used with side car attachments which, as is well known, are apt to apply a side strain on the steering wheel, tending to cause the wheel to be thrown out of alignment and putting heavy stress on any moving parts such as the telescopic parts of the spring fork with which motor cycles are usually provided.

According to the present invention a spring fork for motor cycles or the like vehicles has the movable parts freely mounted on swivel bearings so that they are capable of slight spherical or pivotal movement relatively to the supports.

This invention is more particularly described with reference to the accompanying drawings in which:—

Figure 1 is a side elevation of a spring fork as applied to a motor cycle.

Figure 2 is a detail view on an enlarged scale showing a wheel axle with the swivel bearing in section.

Figure 5:
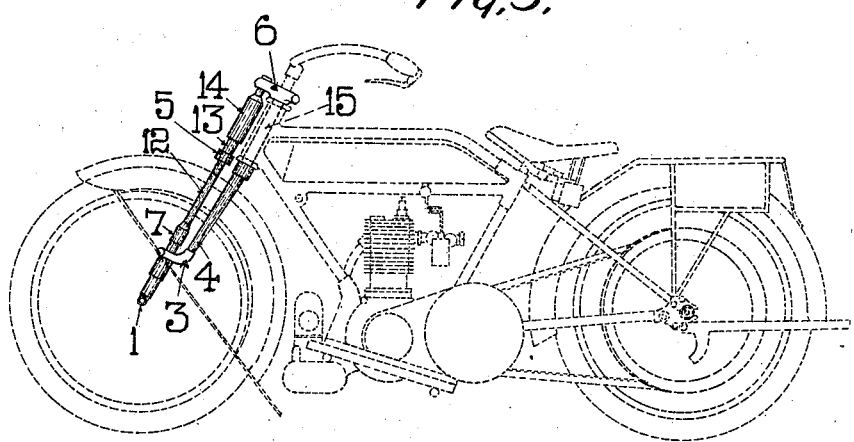
Figure 5 shows the invention as applied to the front fork of a motor cycle.
Figure 3:
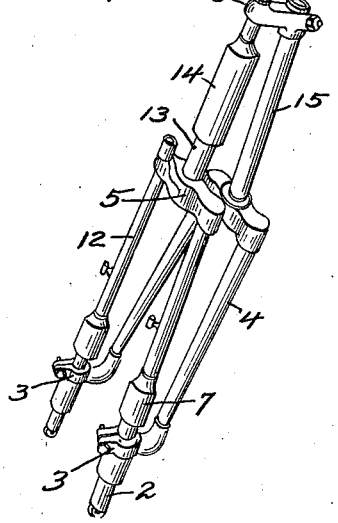
Figure 3 shows a front view in perspective of the spring fork.
Figure 4:
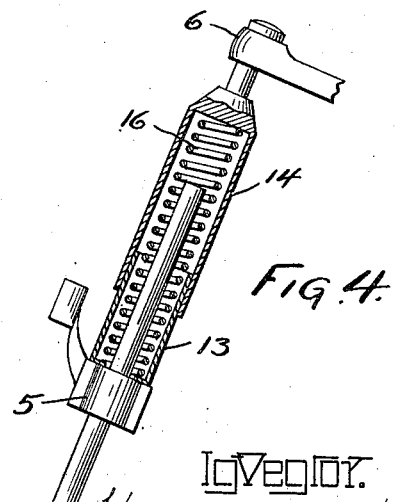
Figure 4 is a detailed view showing spring means between the two fork members.

The device is shown applied to one particular form of spring fork but it is obvious that it may be applied to other types. The spring fork illustrated comprises essentially a rigid steering fork 4 and a fork 12.

A wheel axle 1 is adapted to be carried by the lower end of a pair of spindles 2 secured to the lower ends of the arms of the fork 12 (see Figure 2), the arms being united by a box crown 5. Above the crown 5 extends a member 13 about which telescopes a tubular member 14 or the like. A compression spring 16 is interposed between the members 13 and 14. The member 13 can therefore move in a vertical direction relatively to the spindles 2, any shock or jar being taken up by the spring 16. To provide the necessary rigidity for the wheel fork the stem 15 of the rigid fork 4 is attached by the lug 6, to the member 14, and the arms of the fork 4 also have at their lower ends brackets 3 spherically bushed to receive spherical bearing parts 8 on sleeves 9 which surround the spindles 2 and are adapted to have a vertical movement relatively thereto. Dust excluding sleeve 16 is attached to the sleeve 9 which telescopes with a similar dust excluding sleeve 17 attached to the spindle 2 on the wheel. It has been found that a severe strain imposed on the wheel tends to cause distortion of the spindles 2 thus impeding the spring controlled movement of the fork 4 relatively to the fork 12 by the binding of the spindles 2 on the slidable sleeve 9.

By this invention therefore lugs 3 are provided to connect the arms of the fork 4 to the sleeves 9 and to form a pivotal bearing between said fork and sleeve. To this end the inner surfaces of the lugs 3 form a spherical seating for the sleeve 9 which has the corresponding spherical bearing surface 8.

Any strain set up which would tend to cause slight distortion of the spindles 2 causes a spherical or pivotal movement of the sleeves 9 relatively to the lugs 3, whereby the sleeves 9 tend to remain parallel to the spindles 2 and allow of the continued relative vertical movement. Suitable shrouding guides 7 may be provided to enclose the moving parts and to prevent the waste of lubricant therefrom.

The spindle 2 may be perforated as at 10 for the passage of lubricant on the sliding surfaces between the spindle 2 and the guide 9. The invention is above shown as applied to the front fork of a motor cycle but it is obvious that it is also applicable to other fork supports for vehicle wheels.

I declare that what I claim is:—

1. A fork support for vehicle wheels comprising a pair of spindles, a wheel axle supported on said spindles, a fork supporting said spindles, a rigid steering fork, means to allow of relative axial movement between said spindles and said steering fork, and means to prevent binding of said spindles within said supporting fork on the distortion of said spindles.

2. A fork support for vehicle wheels comprising a pair of spindles, a wheel axle supported on said spindles, a fork supporting said spindles, sleeves surrounding said spindles and adapted to slide axially relatively thereto, a steering fork supporting said sleeves and spherical bearings between said sleeves and said steering fork.

3. A fork support for vehicle wheels comprising a pair of spindles, a wheel axle supported on said spindles, a fork supporting said spindles, a member axially movable relatively to said fork, sleeves surrounding said spindles and axially displaceable thereto, a steering fork rigidly connected to said movable member and supporting said sleeves, and spherical bearings between said sleeves and said steering fork.

4. A fork support for vehicle wheels comprising a fork, a pair of spindles mounted on said fork, a wheel axle supported on said spindles, a cylindrical member axially movable relatively to said fork, means to restrain said relative movement, axially displaceable sleeves surrounding said spindles, a steering fork rigidly connected to said movable member and supporting said sleeves and spherical bearings between said sleeves and said steering fork.

5. A fork support for vehicle wheels comprising a fork, a pair of parallel spindles mounted on said fork, a wheel axle supported on said spindles, a cylindrical member axially movable relatively to said fork, a compression spring between said fork and said movable member, axially displaceable sleeves surrounding said spindle, a steering fork rigidly connected to said movable member and supporting said sleeves and spherical bearings between said sleeves and said steering fork.

6. A steering fork for vehicle wheels comprising a fork, a pair of spindles mounted on said fork, a wheel axle supported on said spindles, a cylindrical member axially movable relatively to said fork, a compression spring between said fork and said movable member, axially displaceable sleeves surrounding said spindles and having spherical bearings and a steering fork rigidly attached to said movable member and having spherical surfaces co-operating with the spherical bearings on said sleeves.

In witness whereof, I have hereunto signed my name in the presence of two subscribing witnesses.

HERBERT OLIVER WOOD.

Witnesses:
ALEXANDER DOOLMES,
CHAS. SUDDARDS.